US007036200B2

(12) United States Patent
Fabrige

(10) Patent No.: US 7,036,200 B2
(45) Date of Patent: May 2, 2006

(54) METHOD FOR MAKING DECORATIVE OBJECT

(76) Inventor: Anastazja Fabrige, 843 via Colinas, Westlake Village, CA (US) 91362

( * ) Notice: Subject to any disclaimer, the term of this patent is extended or adjusted under 35 U.S.C. 154(b) by 87 days.

(21) Appl. No.: 10/265,054

(22) Filed: Oct. 4, 2002

(65) Prior Publication Data

US 2003/0066178 A1 Apr. 10, 2003

Related U.S. Application Data

(60) Provisional application No. 60/327,883, filed on Oct. 5, 2001.

(51) Int. Cl.
*B23P 17/00* (2006.01)

(52) U.S. Cl. ............................ 29/416; 29/425; 29/412

(58) Field of Classification Search .................. 29/416, 29/425, 412; 434/82, 84
See application file for complete search history.

(56) References Cited

U.S. PATENT DOCUMENTS 4,514,175 A * 4/1985 Zaruba et al. ................ 434/82
5,439,538 A * 8/1995 Perry .......................... 156/63
6,626,678 B1 * 9/2003 Forbes et al. ............... 434/247

* cited by examiner

*Primary Examiner*—John C. Hong
(74) *Attorney, Agent, or Firm*—Fulbright & Jaworski L.L.P.

(57) ABSTRACT

A separate shaped backing piece is fabricated for each section of the design, and a piece of fabric (or other flexible material) appropriate for that section is placed over the front of the piece and wraps around its borders. The backing pieces are cut or otherwise formed from a relatively stiff material such as a sheet of cardboard or plastic. A piece of fabric is preferably stretched over each stiff backing piece and the edges of the fabric are preferably secured to its rear, although in other embodiments the fabric may be loosely draped in folds or pleats, and/or a layer of padding may be placed between the fabric and the backing to provide a softer, three-dimensional effect. The otherwise visible front face of the backing piece is completely covered by the fabric, with no visible seams. The individual fabric-covered backing pieces may then assembled into the desired design. A computer may be used to assist in the selection and fabrication of the various design elements.

14 Claims, 4 Drawing Sheets

METHOD FOR MAKING DECORATIVE OBJECT

This application is based on and claims priority from my prior provisional application No. 60/327,883, entitled "Decorative pictures using textile as abstract liquid paint."

BACKGROUND

Textiles are used for a number of decorative and utilitarian purposes, including screens, drapes, furniture covers, and wall hangings. They may be formed of one or more pieces of cloth, with designs woven into the fabric or printed or tie-dyed. Non-woven fabrics, plastic films, and other flexible sheet-like materials may be substituted for traditional woven textiles in many of these applications.

Quilts are decorative objects typically made from multiple scraps of patterned cloth which are sewn together to create a large design which may be geometrical, abstract, or even representational. Anther well known category of decorative textile objects are embroidered samplers, in which the design is formed from colored threads sewn onto a plan sheet of fabric on which a design has been sketched or printed.

BRIEF SUMMARY OF INVENTION

The present invention is related generally to decorative objects and the like, and more particularly to a method for making such objects from individual pieces of fabric or other sheet-like flexible materials, preferably with different printed patterns that provide different colors and shadings (or textures) to the different sections of the completed object.

In a preferred embodiment, a separate shaped backing piece is fabricated for each section of the design, and a piece of fabric appropriate for that section is placed over the front of the piece and wraps around its borders. The backing pieces are cut or otherwise formed from a relatively stiff material such as a sheet of cardboard or plastic. A piece of fabric is preferably stretched over each stiff backing piece and the edges of the fabric are preferably secured to its rear, although in other embodiments the fabric may be loosely draped in folds or pleats, and/or a layer of padding may be placed between the fabric and the backing to provide a softer, three-dimensional effect. In any event, the otherwise visible front face of the backing piece is completely covered by the fabric, with no visible seams. The individual fabric-covered backing pieces may then assembled into the desired design.

In one preferred embodiment, the overall design is printed or drawn on a separate sheet of stiff material (such as a colored cardboard mat) and the individual fabric covered pieces are secured to designated portions of that overall design.

The invention is defined in the appended claims, some of which may be directed to some or all of the broader aspects of the invention set forth above, while other claims may be directed to specific novel and advantageous features and combinations of features that will be apparent from the Detailed Description that follows.

BRIEF DESCRIPTION OF DRAWINGS

FIG. 3 comprising

DETAILED DESCRIPTION OF EXEMPLARY EMBODIMENTS

Referring to the appended drawings, an exemplary method for constructing such as the decorative textile object of FIG. 5 will now be described.

Figure 1:
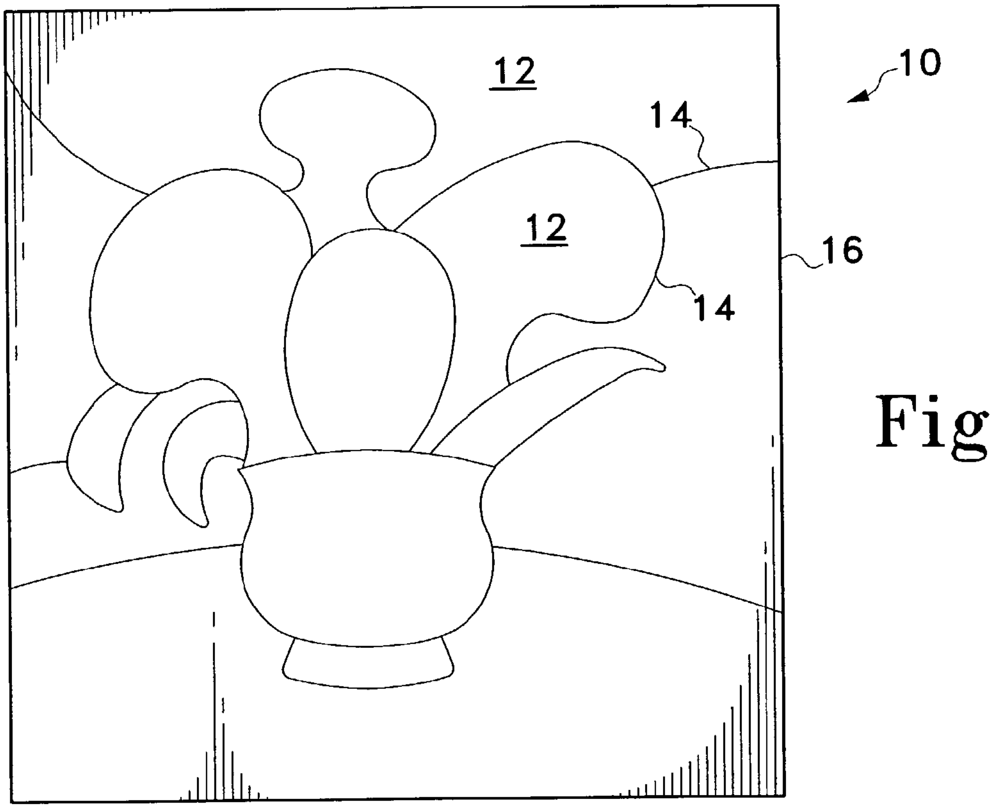
FIG. 1 shows a mat board on which an exemplary design has been drawn or printed in accordance with one embodiment of the invention.

First, as shown generally in FIG. 1, an overall two-dimensional design 10 is selected and divided into contiguous sections 12. In a preferred embodiment, the design and the included sections are imprinted (lines 14) on a relatively stiff mat board 16 such as may be commonly found in a graphics supply shop. The imprinting may take the form of a conventional printing process, or may be done freehand. The design may be original, copied from a photographic, or reproduced from an existing design inventory. The division into sections preferably follows defined lines and borders in the original design image, but a defined portion of the original image may be divided arbitrarily into multiple sections, and contiguous portions of the original image may be combined arbitrarily into a single section. As best seen in FIG. 5, the overall objective is to provide an ornamental effect that uses different shapes and patterns to achieve an effect that is not completely natural and that is not completely geometrical.

Figure 2:
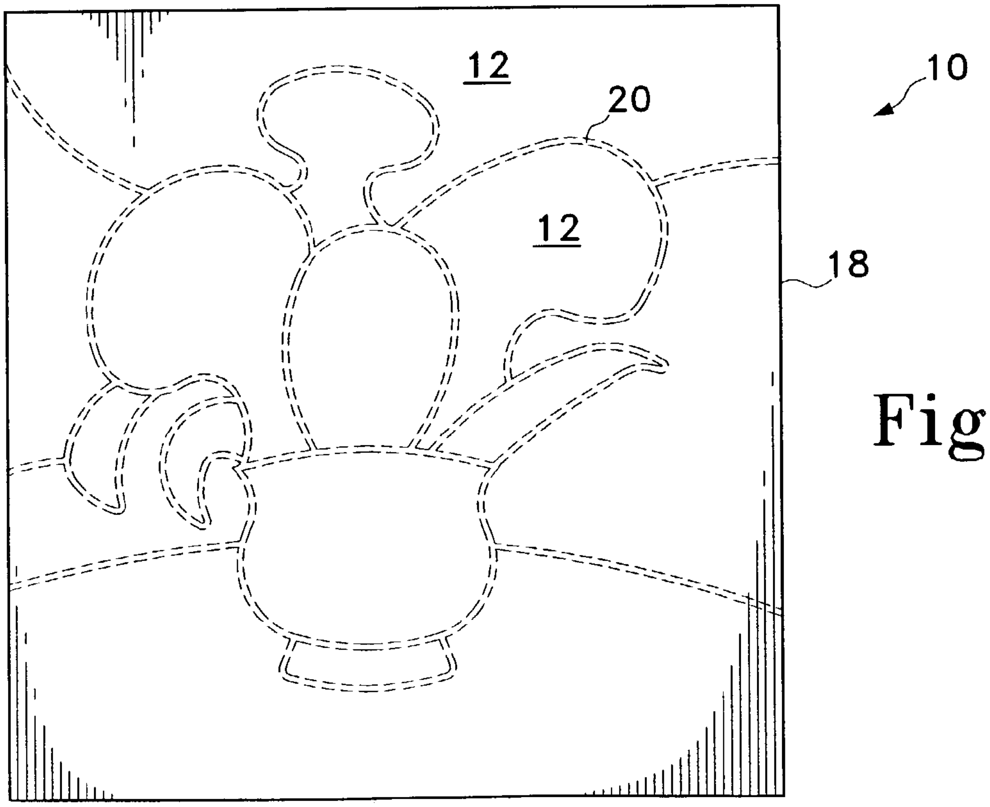
FIG. 2 shows a pattern board on which an outline for the individual backing pieces required to form the design of FIG. 1 has been die-cut or otherwise specified.
Figure 3A:
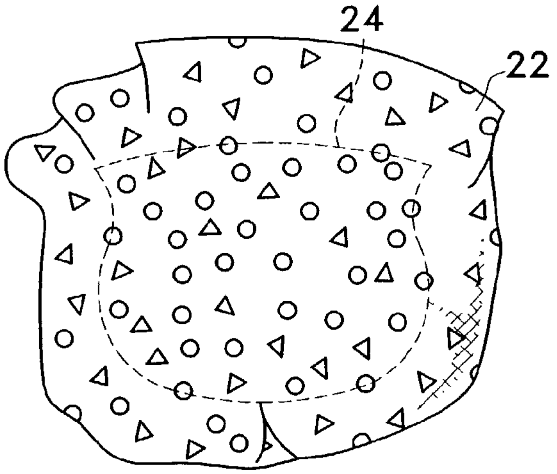
FIGS. 3A through 3D shows the steps in covering a shaped backing piece with a corresponding piece of fabric, in accordance with an exemplary embodiment of the invention.
Figure 3B:
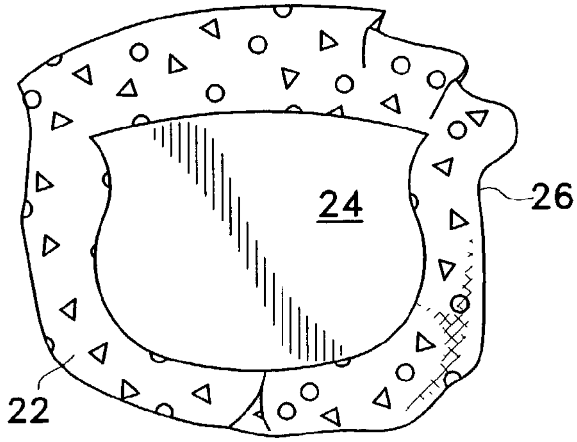
Figure 3C:
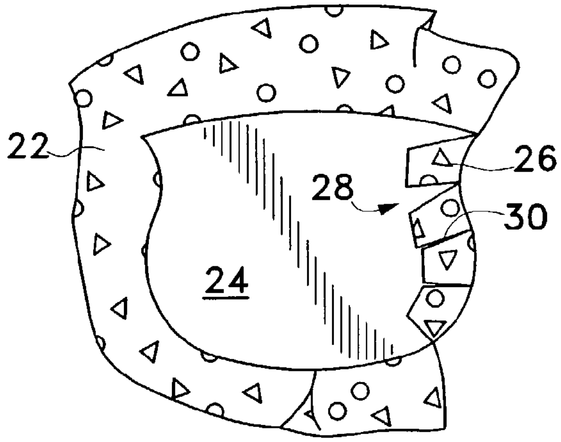
Figure 3D:
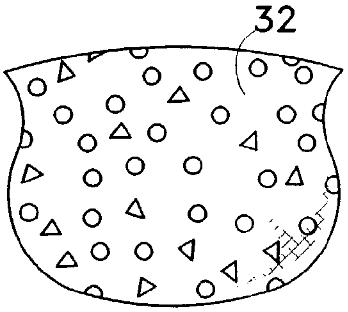

Second, as shown generally in FIG. 2, the defined sections 12 are laid out on a pattern board 18, also formed of a relatively still material such as was used for the mat board. The individual sections may be die cut in a manner similar to form a jig saw puzzle, but are preferably separated from each other by a small gap 20 to accommodate the fabric therebetween.

Third, as shown in FIG. 3, a piece 22 of fabric preferably having a selected pattern and pattern orientation, that is somewhat larger in area than the backing piece 24, is placed over the front of the backing piece (FIGS. 3A and 3B), and the edges of the fabric 26 are wrapped over the edges of the backing piece and preferably secured to a corresponding region on its rear face 28 (FIG. 3C) by a suitable adhesive. The edge of the fabric may be slit or darted 30 to facilitate a neat appearing front 32 (FIG. 3D) that is completely covered by the fabric. Depending on the effect desired, the fabric may be loosely draped over the front face in folds or pleats, and/or a layer of padding may be placed between the fabric and the backing to provide a softer, three-dimensional effect. Alternatively, the fabric may be stretched over the front face and/or secured to the front face by a suitable adhesive to provide a more formal, starched effect.

Figure 4:
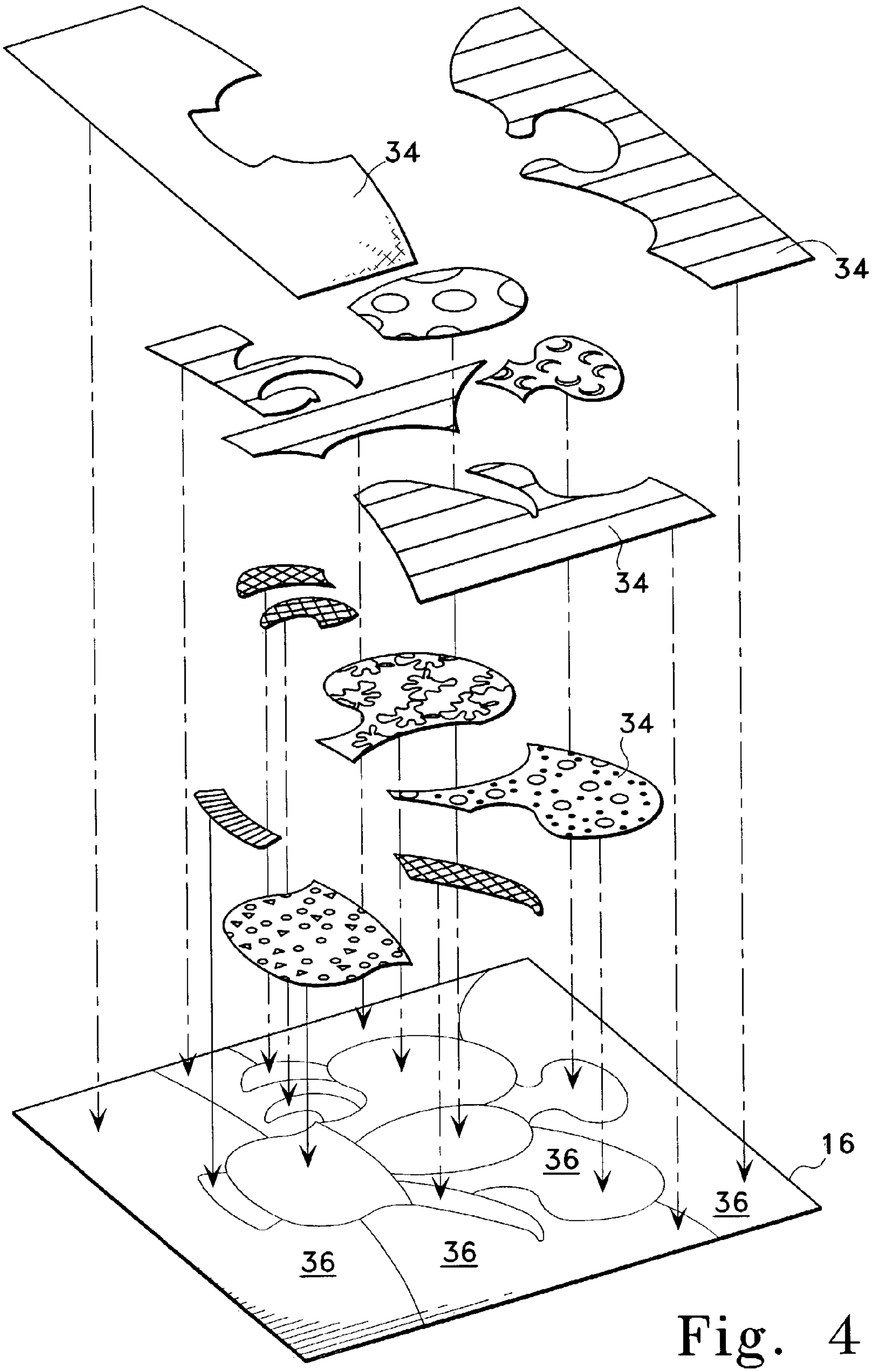
FIG. 4 shows the pattern board of FIG. 2 after it has been cut or separated into individual backing pieces with each piece covered with an appropriate piece of fabric and about to be mounted onto the mat board of FIG. 1.

As shown in FIG. 4, once the individual backing pieces have been covered with fabric with respective patterns and pattern orientations that are appropriate to overall design, these covered pieces 34 are preferably assembled, for example by glue or double sided tape, to their designated positions 36 on the mat board 16.

Figure 5:
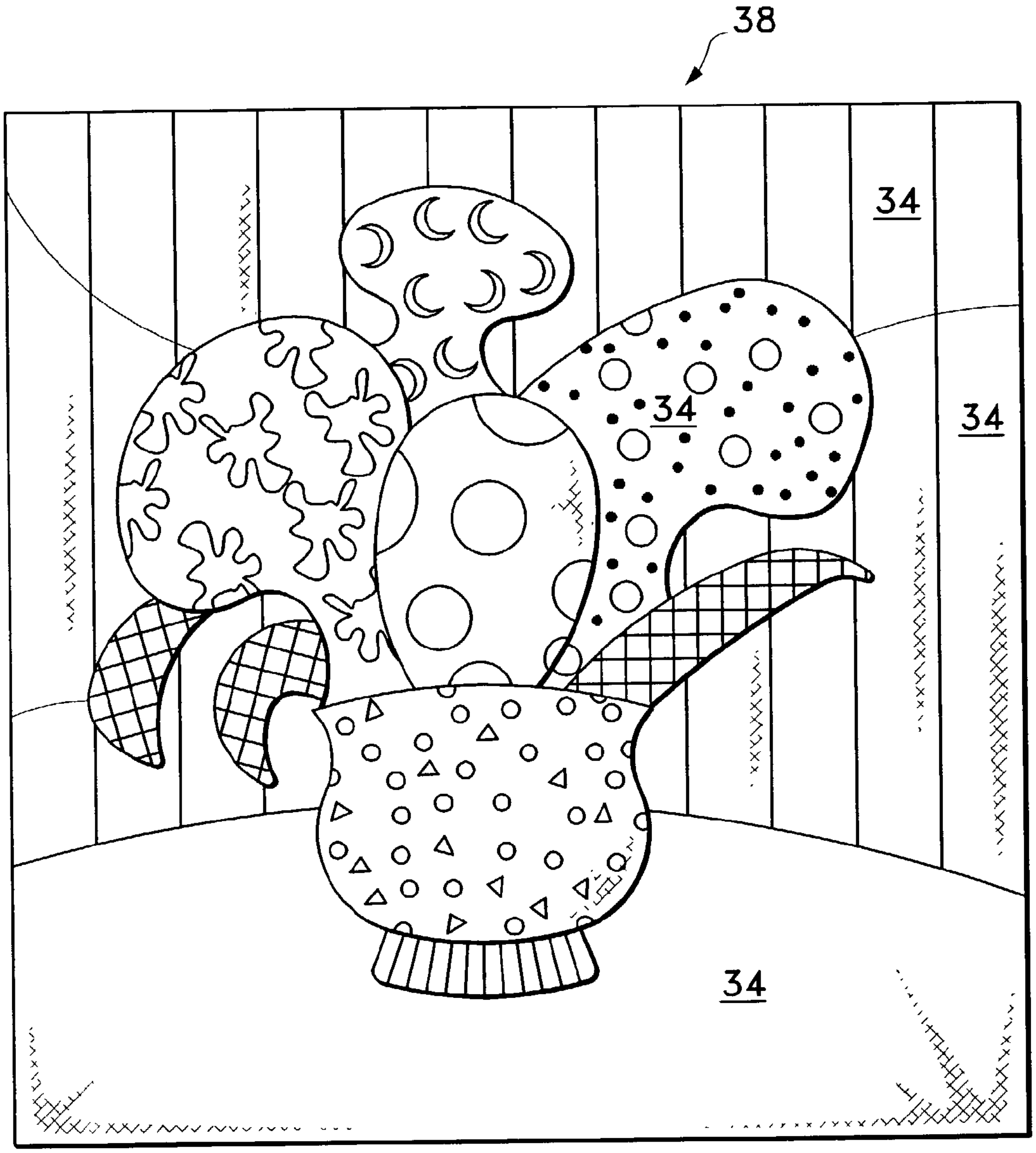
FIG. 5 shows the individual covered pieces of FIG. 4 mounted to the board of FIG. 1.

The result, as shown in FIG. 5, is a decorative textile object 38 that preferably combines shapes, colors, patterns, orientations and/or textures into an overall design that achieves a highly artistic and individualized effect that is neither completely realistic nor completely geometrical, and that is especially suitable for teaching artistic principles of design and composition in a manner that will be highly satisfying even to relatively unskilled students. Depending on the desires of its creator, the assembled object can be framed, incorporated into a larger collage of objects, and/or further embellished with handwritten markings and other surface ornamentation.

Although the above embodiment is intended for mass production and is especially suitable in a class environment with many students using the same basic design, shapes, and fabric patterns to achieve many different personalized but equally satisfying results, other embodiments can provide much greater flexibility and choice to the individual creator. For example, the design could be selected from a computerized design library, perhaps modified by the user, the user could use his or her computer to select or alter the sizes and shapes of the individual sections, and various fabric colors and patterns could be selected from a computerized collection of simulated fabric swatches and dragged with different orientations and magnifications onto different sections of the design. At each stage of the selection process, a computer generated replica of the corresponding resultant object could be displayed for approval or further modification. Once the user is satisfied with the overall effect, the computer could then print the selected designs, backing pieces and patterns on plain sheets of cardboard and fabric (or on iron-on transfer paper which could then be used to print an outline or pattern on a larger sheet of fabric), which the user could then cut apart and assembled as previously described. In another embodiment, the fabric could be replaced with a flexible sheet of material that is more adaptable to imprinting by the type of printer typically connected to a personal computer.

Having described certain preferred embodiments of the invention (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims. For example, rather than a relatively limp piece of woven fabric, the covering material could include a metallic foil layer which retains its shape when folded, thereby securing the folded edges in a desired position without adhesive.

The invention claimed is:

1. A method for making a decorative object from individual pieces of a flexible sheet-like material, comprising the steps:

dividing a two dimensional design contained within a defined border into a plurality of contiguous two dimensional sections to thereby define a sectioned two dimensional design such that at least one shared boundary between two contiguous said sections extends into said border;

imprinting said sectioned design onto a front surface of a mat board having an outer perimeter corresponding to said defined border;

fabricating a separate shaped backing piece corresponding to each section of the sectioned design:

selecting a separate piece of sheet-like material for each shaped backing piece;

securing each piece of material to its respective backing piece such that a front face of the backing piece is completely covered by the material to thereby form a respective individual covered backing piece; and assembling the covered backing pieces onto said front surface of said mat in accordance with said imprinted design, such that said front surface is substantially completely overlaid with the covered backing pieces with at least two adjacent said covered backing pieces each extending substantially into said outer perimeter.

2. The method of claim 1 wherein one or more edges of the sheet-like material are secured to a rear surface of the backing piece.

3. The method of claim 1 wherein the backing pieces are formed from a relatively stiff material.

4. The method of claim 3 wherein the sheet-like material is a textile fabric.

5. The method of claim 4 wherein the textile fabric is stretched over the stiff backing.

6. The method of claim 4 wherein the fabric is loosely draped in folds or pleats.

7. The method of claim 4 wherein a layer of padding is placed between the fabric and the backing piece.

8. The method of claim 1 wherein the separate pieces of sheet-like material are of multiple designs.

9. The method of claim 1 wherein the separate backing pieces are of multiple shapes.

10. The method of claim 1 wherein at least some of said pieces of material each having a predetermined pattern with a discernable pattern orientation each piece of material is secured to its respective backing piece with a selected pattern orientation.

11. A method for assembling a kit of parts adapted to make a decorative textile object, comprising the steps:

selecting a two-dimensional design contained within a defined border;

dividing the design into contiguous two-dimensional sections such that at least one shared boundary between two contiguous said sections extends into said border;

selecting a pluratilty of patterns each having a respective pattern orientation;

fabricating a mat board on which said design has been imprinted;

fabricating a pattern board on which said sections have been die-cut or otherwise indicated; and providing a quantity of flexible material imprinted with different said patterns to cover at least a front face and surrounding edges of each of the sections with a corresponding chosen pattern and pattern orientation.

12. The method of claim 11, further comprising the step:

separating individual said sections from said pattern board.

13. The method of claim 11, wherein the quantity of material includes a separate piece of fabric for each of said sections.

14. The method of claim 11 wherein the relatively stiff material is selected from the group consisting of cardboard and plastic.

* * * * *